United States Patent
Leppänen et al.

(10) Patent No.: US 9,251,359 B2
(45) Date of Patent: Feb. 2, 2016

(54) METHOD AND APPARATUS FOR MANAGING CROWD SOURCED CONTENT CREATION

(71) Applicant: Nokia Technologies Oy, Espoo (FI)

(72) Inventors: Jussi Artturi Leppänen, Tampere (FI); Sujeet Shyamsundar Mate, Tampere (FI); Igor Danilo Diego Curcio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/788,844

(22) Filed: Mar. 7, 2013

(65) Prior Publication Data

US 2014/0259179 A1   Sep. 11, 2014

(51) Int. Cl.
| | |
|---|---|
| *G06F 7/04* | (2006.01) |
| *G06F 21/62* | (2013.01) |
| *G11B 20/00* | (2006.01) |
| *H04N 5/76* | (2006.01) |
| *H04N 5/77* | (2006.01) |

(52) U.S. Cl.
CPC ............. *G06F 21/62* (2013.01); *G11B 20/00* (2013.01); *H04N 5/76* (2013.01); *H04N 5/77* (2013.01)

(58) Field of Classification Search
CPC ... G06F 21/10; G11B 20/00086; G06Q 30/06
USPC ...................... 726/27; 705/59, 902
See application file for complete search history.

(56) References Cited

U.S. PATENT DOCUMENTS

| | | | | |
|---|---|---|---|---|
| 8,424,108 | B2 * | 4/2013 | Hiratsuka ........................ | 726/31 |
| 2001/0056404 | A1 * | 12/2001 | Kuriya et al. .................. | 705/51 |
| 2002/0049679 | A1 * | 4/2002 | Russell et al. .................. | 705/52 |
| 2003/0004888 | A1 * | 1/2003 | Kambayashi et al. .......... | 705/59 |
| 2003/0061165 | A1 * | 3/2003 | Okamoto et al. ............... | 705/52 |
| 2003/0069854 | A1 * | 4/2003 | Hsu et al. ........................ | 705/59 |
| 2003/0212905 | A1 * | 11/2003 | Tran et al. ..................... | 713/201 |
| 2005/0120232 | A1 * | 6/2005 | Hori et al. ..................... | 713/193 |
| 2009/0009605 | A1 | 1/2009 | Ortiz | |
| 2009/0164801 | A1 * | 6/2009 | Kawahara ..................... | 713/189 |
| 2011/0026898 | A1 | 2/2011 | Lussier et al. | |

(Continued)

OTHER PUBLICATIONS

"Floating Licensing," *Wikipedia: The Free Encyclopedia*, Wikimedia Foundation, Inc., last updated Jun. 28, 2013, Web, Retrieved from <http://en.wikipedia.org/wiki/Floating_licensing> on Jul. 9, 2013, 1 page.

(Continued)

*Primary Examiner* — Teshome Hailu
(74) *Attorney, Agent, or Firm* — Alston & Bird LLP

(57) ABSTRACT

A method, apparatus, computer program product and system are provided for managing crowd sourced content creation. In this regard, a method is provided that includes receiving information regarding at least one content recording device and information regarding a recording subject. The method further includes determining whether the at least one content recording device is eligible to receive at least one permission indicator, based at least in part on the information regarding the at least one content recording device and the information regarding the recording subject. The method also includes causing the at least one permission indicator to be provided to the at least one content recording device in an instance in which it is determined that the at least one content recording device is eligible to receive the at least one permission indicator.

20 Claims, 8 Drawing Sheets

(56) References Cited

U.S. PATENT DOCUMENTS

2012/0251080 A1 10/2012 Svendsen et al.
2012/0311448 A1 12/2012 Achour et al.
2013/0283357 A1* 10/2013 Kozuka et al. .................. 726/4

OTHER PUBLICATIONS

Extended European Search Report for Application No. 14157420.2; dated Apr. 28, 2014.

* cited by examiner

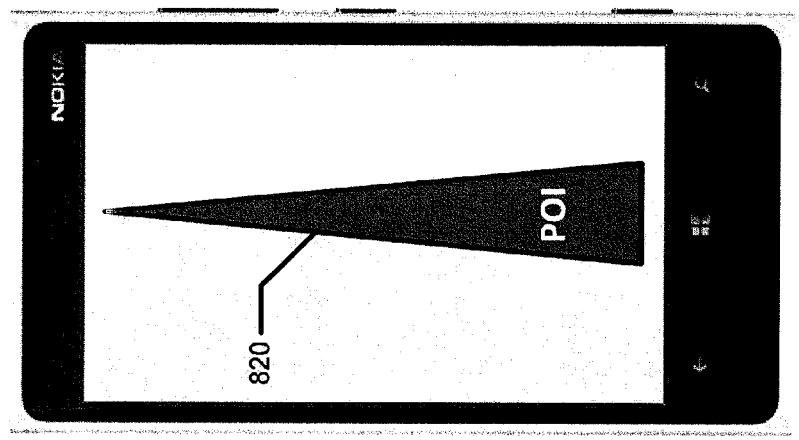
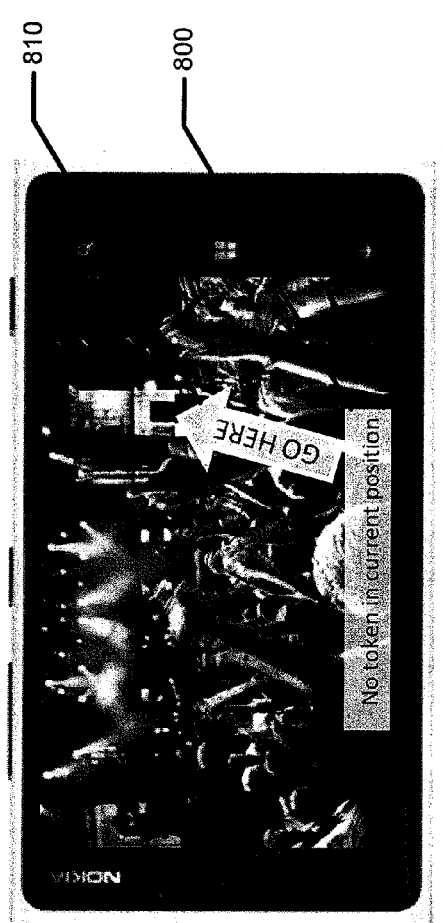
Figure 8a
Figure 8b

METHOD AND APPARATUS FOR MANAGING CROWD SOURCED CONTENT CREATION

TECHNOLOGICAL FIELD

An example embodiment of the present invention relates generally to techniques for managing content creation and, more particularly, to a method and apparatus for managing crowd sourced content creation.

BACKGROUND

Crowdsourcing techniques are increasingly being leveraged for content production. A movie of an event, such as a concert, for example, may be created using crowdsourcing techniques by collecting footage recorded by multiple users via their personal recording devices, and then assembling the footage into a final product. Crowdsourcing can thus substantially reduce the costs and time required to produce a piece of content. However, ensuring a quality final product can be quite challenging for various reasons.

For example, if a large amount of content has been recorded from the same or similar locations, the final product may be bland and monotonous. Furthermore, the quality of the content recorded by various users may vary a great deal based, for example, on the recording devices being used and the experience levels of the users. Faced with accounting for these factors, along with many others, it can be difficult for content producers to ensure they collect a sufficient quantity and quality of crowd sourced content.

BRIEF SUMMARY

A method, apparatus and computer program product are therefore provided according to an example embodiment of the present invention for managing crowd sourced content creation. In this regard, the method, apparatus, and computer program product of one embodiment may receive information regarding one or more mobile recording devices and a recording subject and determine which of the one or more mobile recording devices are eligible to receive a permission indicator, such as a token, to record content or upload recorded content. Further embodiments may provide incentive mechanisms, such as by giving priority to particularly experienced or skilled users when distributing permissions. Other example embodiments may provide suggestions to users who have not been selected to receive permissions about how they can become eligible to receive them.

In one embodiment, a method is provided that includes receiving information regarding at least one content recording device and receiving information regarding a recording subject. The method of this embodiment further includes determining, based at least in part on the information regarding the at least one content recording device and the information regarding the recording subject, whether the at least one content recording device is eligible to receive at least one permission indicator. The method further includes causing the at least one permission indicator to be provided to the at least one content recording device in an instance in which it is determined that the at least one content recording device is eligible to receive the at least one permission indicator.

In a further embodiment, an apparatus is provided that includes at least one processor and at least one memory including program code instructions, the at least one memory and the program code instructions being configured to, with the processor, direct the apparatus to at least receive information regarding at least one content recording device and receiving information regarding a recording subject. The apparatus of this embodiment is further directed to determine, based at least in part on the information regarding the at least one content recording device and the information regarding the recording subject, whether the at least one content recording device is eligible to receive at least one permission indicator. The apparatus is further directed to cause the at least one permission indicator to be provided to the at least one content recording device in an instance in which it is determined that the at least one content recording device is eligible to receive the at least one permission indicator.

In an even further embodiment, a computer program product is provided that includes a non-transitory computer readable medium storing program code portions therein. The computer program code instructions are configured to, upon execution, direct an apparatus to at least receive information regarding at least one content recording device and receiving information regarding a recording subject. The computer program code instructions of this embodiment are further configured to, upon execution, direct the apparatus to determine, based at least in part on the information regarding the at least one content recording device and the information regarding the recording subject, whether the at least one content recording device is eligible to receive at least one permission indicator. The computer program code instructions of this embodiment are further configured to, upon execution, direct the apparatus to cause the at least one permission indicator to be provided to the at least one content recording device in an instance in which it is determined that the at least one content recording device is eligible to receive the at least one permission indicator.

In a still further embodiment, an apparatus is provided that includes means for receiving information regarding at least one content recording device and means for receiving information regarding a recording subject. The apparatus of this embodiment further includes means for determining, based at least in part on the information regarding the at least one content recording device and the information regarding the recording subject, whether the at least one content recording device is eligible to receive at least one permission indicator. The apparatus even further includes means for causing the at least one permission indicator to be provided to the at least one content recording device in an instance in which it is determined that the at least one content recording device is eligible to receive the at least one permission indicator.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
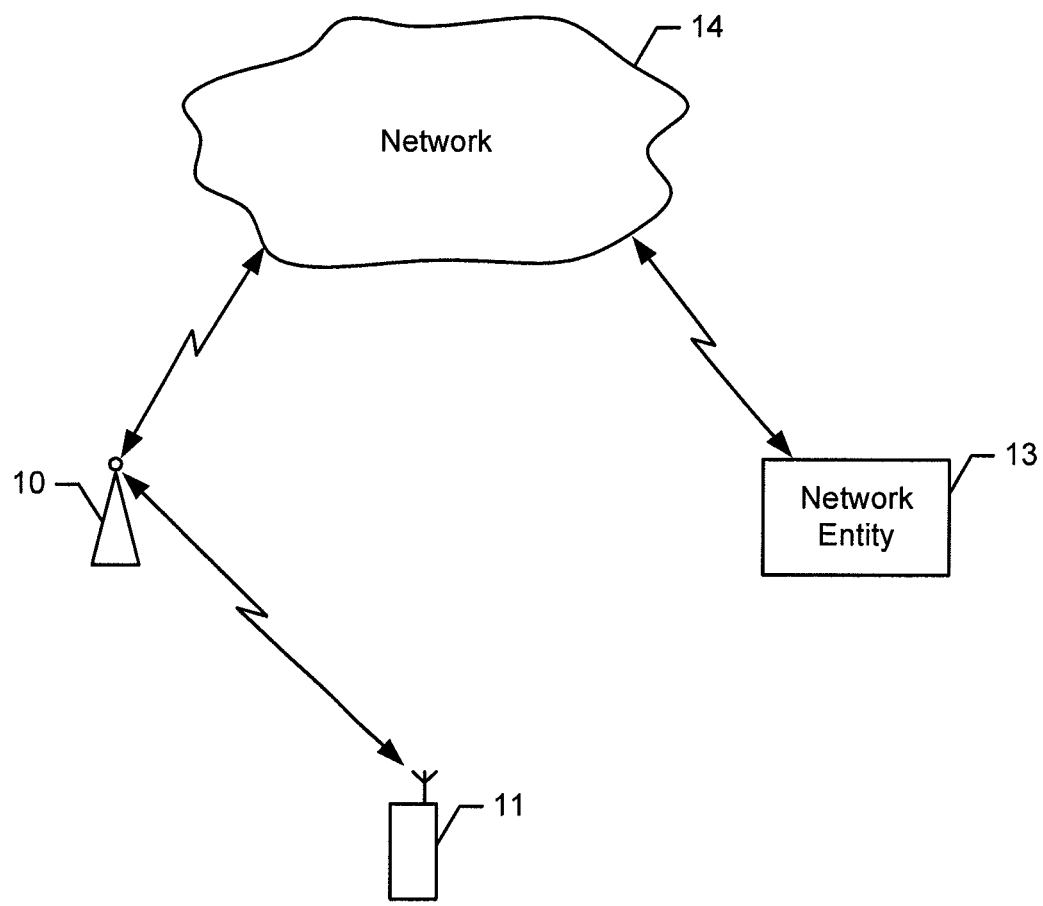
Figure 2:
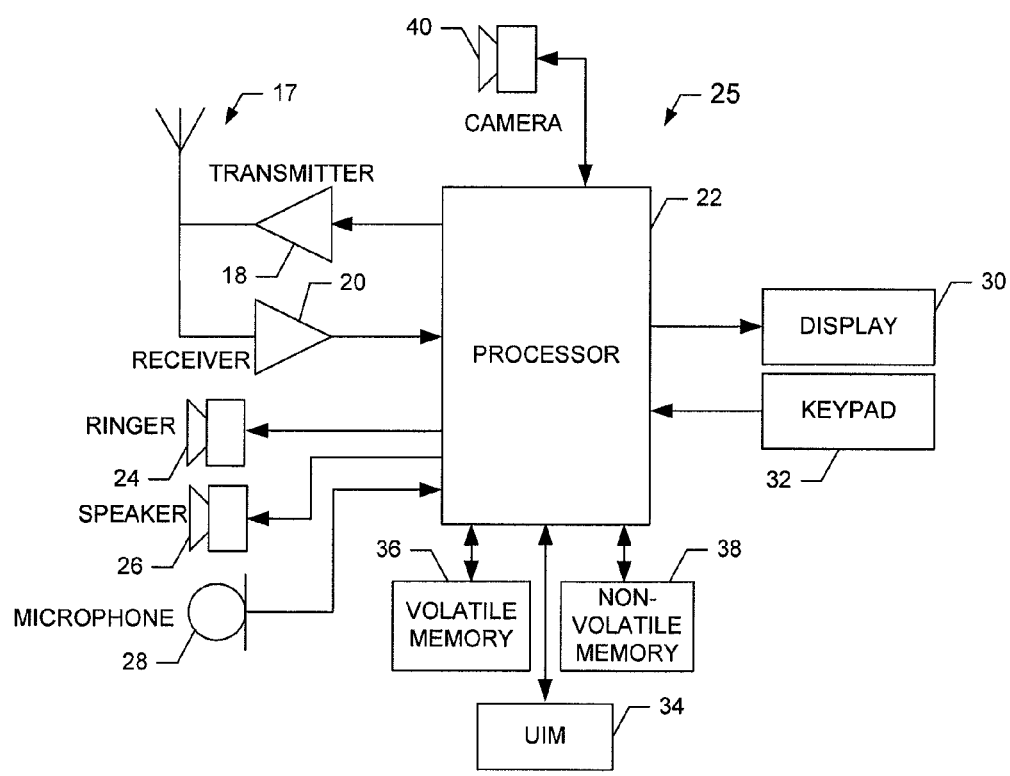
Figure 3:
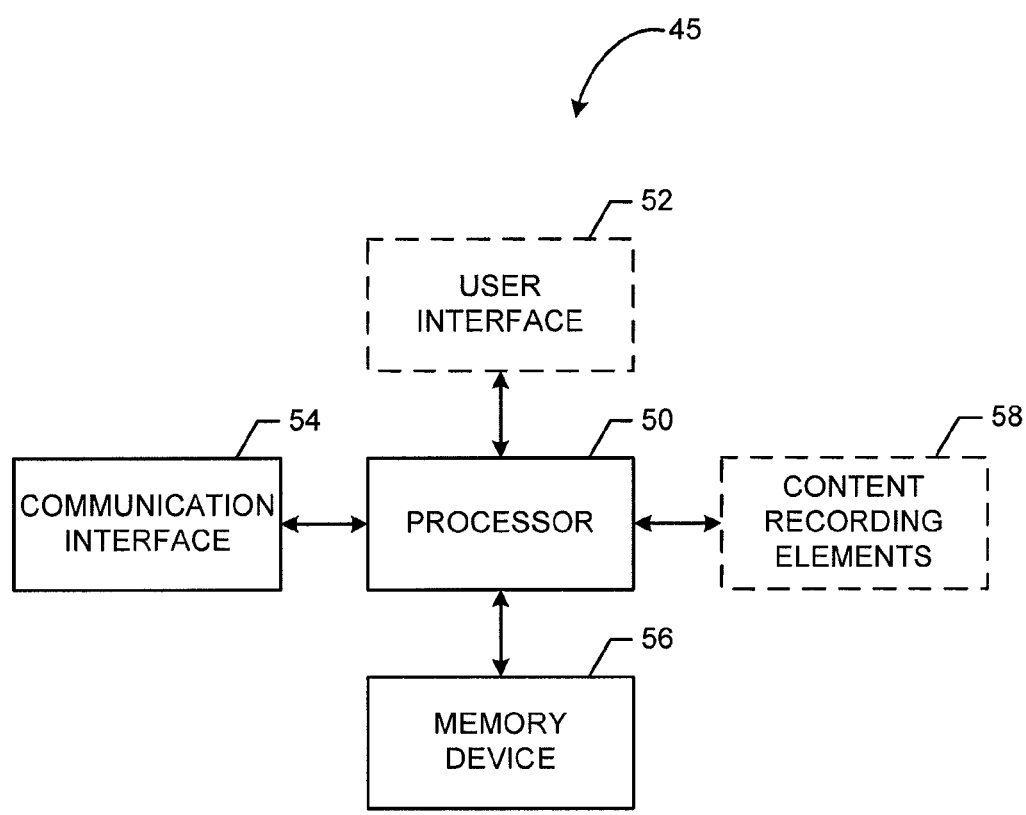
Figure 4:
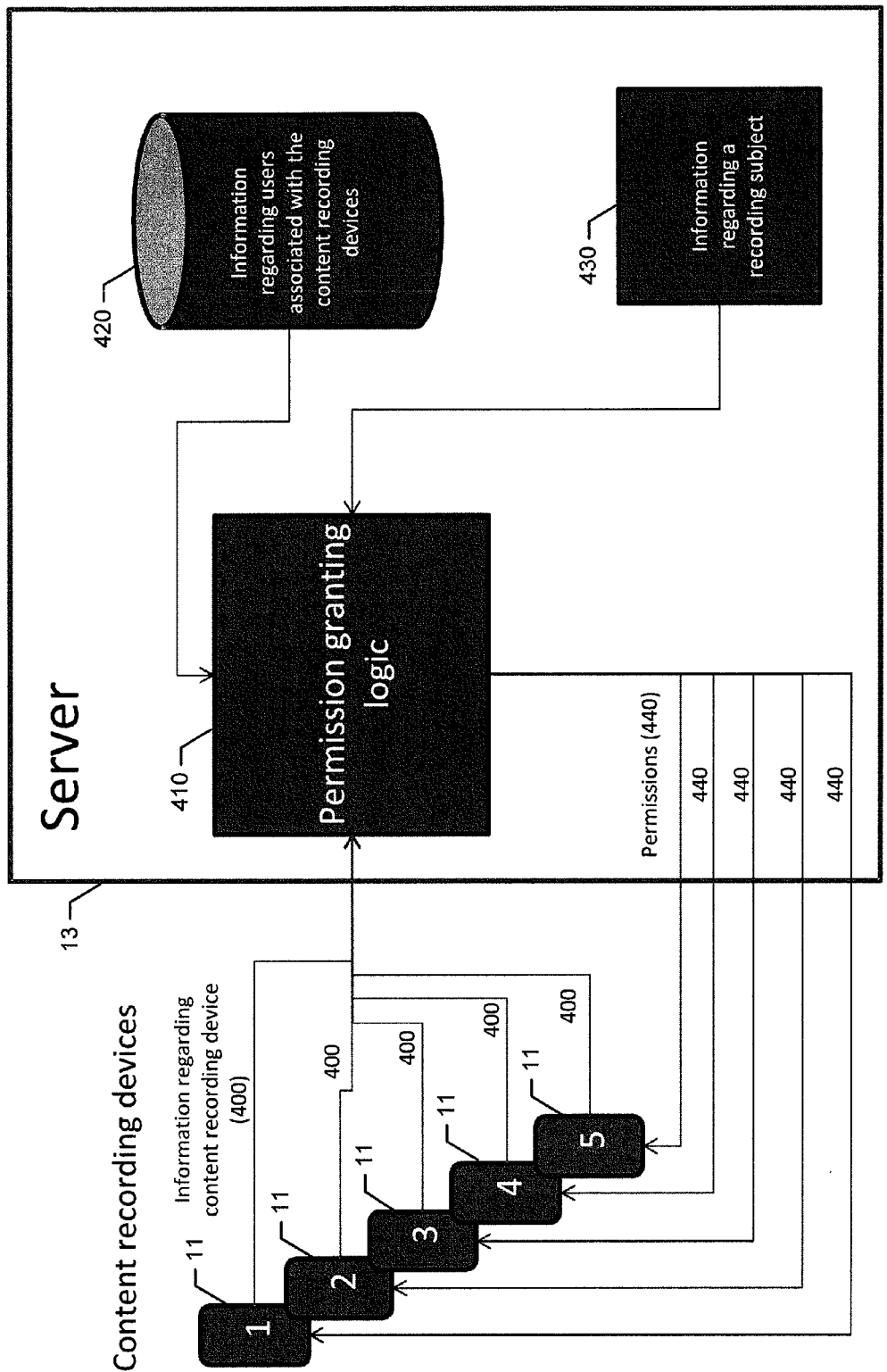
Figure 5:
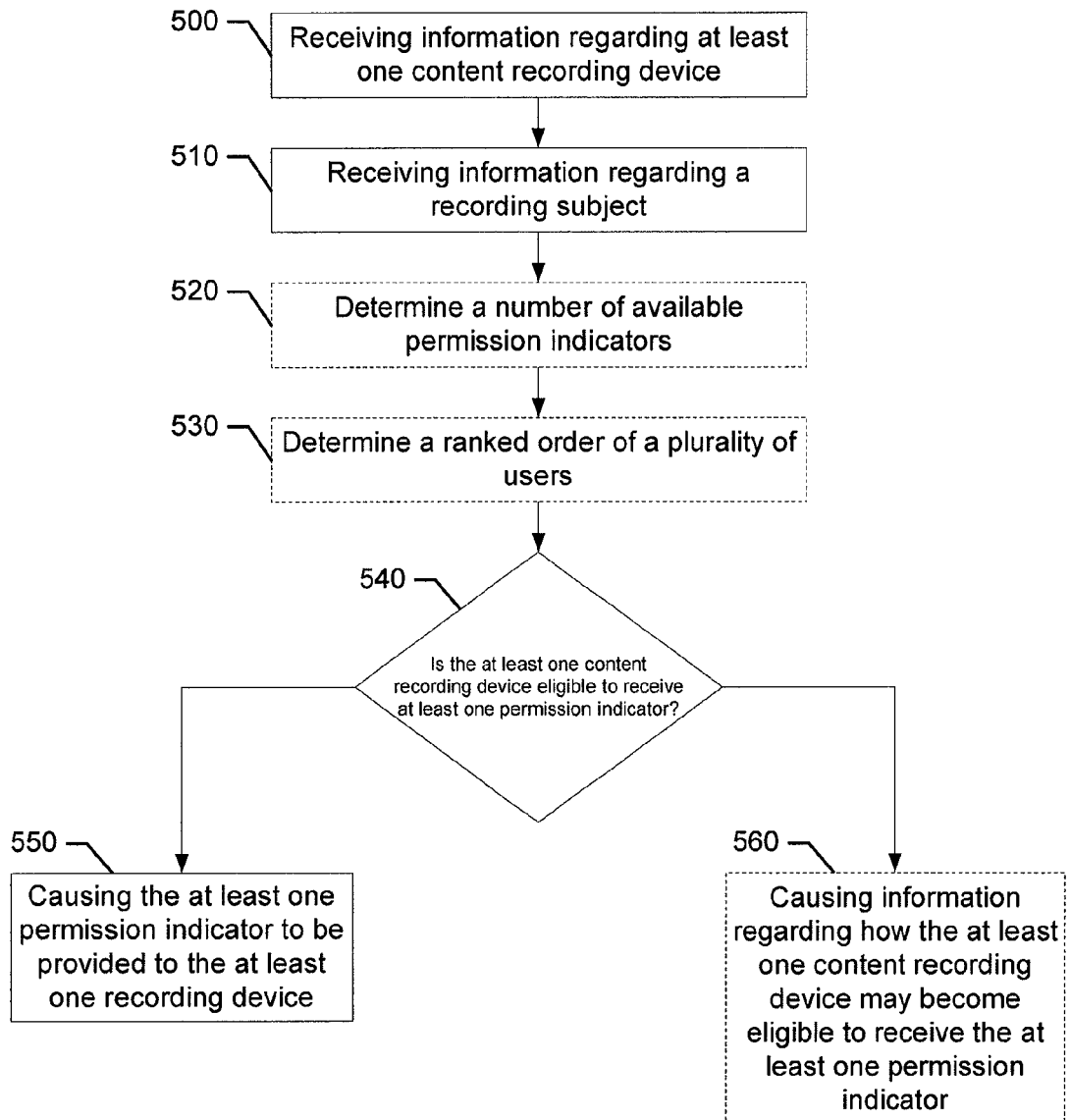
Figure 6:
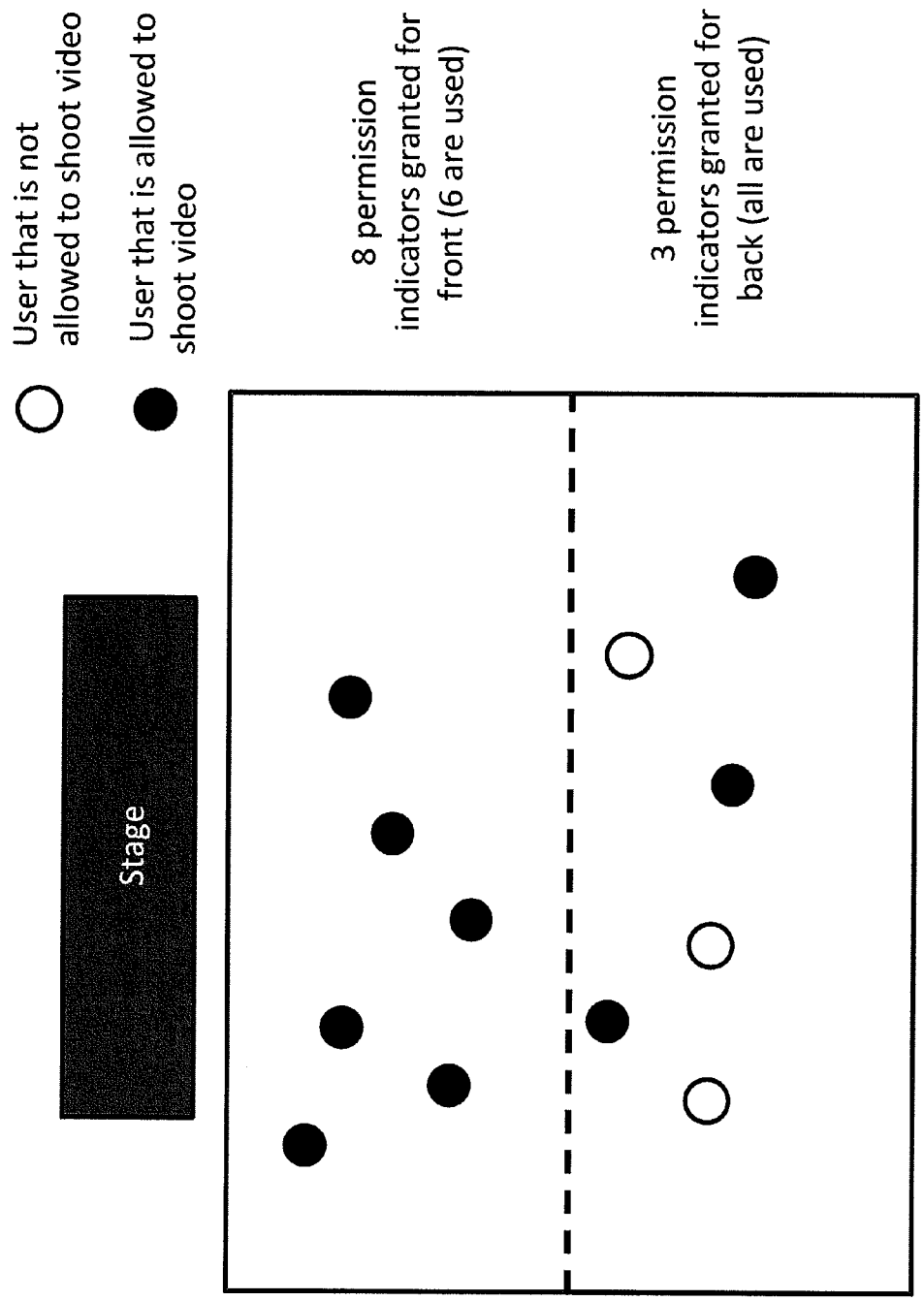
Figure 7:
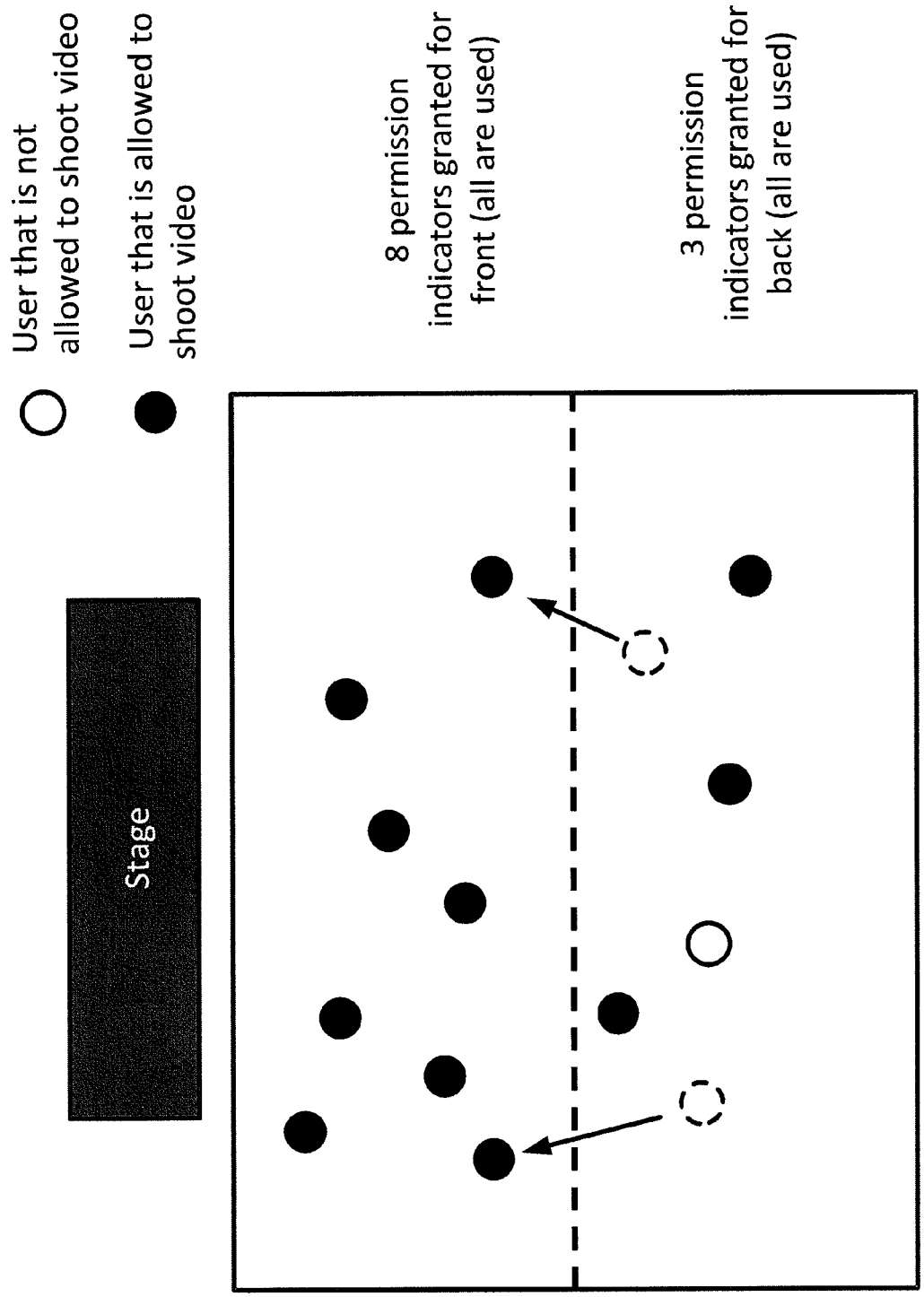

Having thus described example embodiments of the invention in general terms, reference will now be made to the accompanying drawings, which are not necessarily drawn to scale, and wherein:

FIG. 1 is a schematic representation of a system that may support example embodiments of the present invention;

FIG. 2 is a block diagram of an electronic device that may be configured to implement example embodiments of the present invention;

FIG. 3 is a block diagram of an apparatus that may be embodied by or associated with an electronic device, and may be configured to implement example embodiments of the present invention;

FIG. 4 is a block diagram of a system that may be configured to implement an example embodiment of the present invention;

FIG. 5 is a flowchart illustrating operations performed in accordance with example embodiments of the present invention;

FIGS. 6 and 7 are illustrations of an example use case of an example embodiment of the present invention; and FIGS. 8a and 8b are illustrations of example user interfaces which may be caused to be displayed in accordance with example embodiments of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, processed and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As described below, a method, apparatus and computer program product are provided for managing crowd sourced content creation. In this regard, the method, apparatus, and computer program product of one embodiment may receive information regarding one or more content recording devices and a recording subject and determine which of the one or more content recording devices are eligible to receive permission, such as in the form of a token or other type of permission indicator, to record content or upload recorded content. Information about the content recording devices, such as the device's content recording capabilities, e.g., the types and/or quality of its camera and/or microphone, may be taken into account when determining whether it is eligible to receive content recording permissions. Other information may also or alternatively be taken into account, such as location or orientation information, sensor data, or user information for the users associated with the recording devices.

With respect to the user information, further example embodiments may rank users based on the user information, e.g., based on criteria such as the quantity and/or quality of previous recordings made by the users, so that priority can be given to higher ranked users. In this way, the quality of recorded content may be improved by limiting content recording or uploading permissions to users who have been vetted as high quality content contributors. Other example embodiments may provide suggestions to users who have not been selected to receive content recording permission about how they can become eligible to receive the permissions. For example, a user may be directed to a particular location or instructed to point their content recording device in a particular direction. In this way, certain example embodiments may assure that content is being recorded according to the needs of the project.

Information about the recording subject may also be taken into consideration by various embodiments when providing content recording permissions. For example, restrictions on locations or timing of content recordings, such as may be imposed by a venue or a performer, may be taken into account when determining whether to provide permissions to various recording devices and/or in determining the scope of the permissions that are provided. In this way, example embodiments may assure that content is being recorded or uploaded in compliance with any applicable restrictions or regulations.

Having thus outlined in general terms some exemplary features and benefits associated with certain embodiments of the present invention, reference will now be made to FIGS. 1-8b in order to describe these example embodiments and others in even greater detail.

FIG. 1 illustrates a block diagram of a system that may benefit from embodiments of the present invention. While FIG. 1 illustrates one example of a system that would benefit from the present invention, numerous other systems and configurations may also benefit from embodiments of the present invention. With reference to FIG. 1, however, the system may include a user device 11, e.g., a content recording device 11, connected to a network 14 via an access point 10, and a network entity 13 also connected to network 14. User device 11 may be any device that is configured record content and to communicate over any type of network. For example, user device 11 may be a mobile terminal, such as a mobile telephone, PDA, pager, laptop computer, tablet computer, or any of numerous other hand held or portable communication devices, computation devices, content generation devices, content consumption devices, or combinations thereof. User device 11 and network entity 13 may include or be associated with an apparatus 45, such as shown in FIG. 3, configured in accordance with embodiments of the present invention, as described below.

As shown in FIG. 1, user device 11 and network entity 13 may communicate with one another via network 14, which user device 11 may connect to via access point 10. User device 11 and access point 10 may communicate with each other via wireless means such as, for example, WI-FI, BLUETOOTH, or the like, or via wired means such as Ethernet, USB (Universal Serial Bus), or the like. Access point 10 may also allow device 11 to access network 14 via a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network. Access point 10 may communicate with network 14 via wired means, such as via fiber optic or coaxial cable, twisted-pair Ethernet cable, digital subscriber line (DSL), or by connecting with a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network. Network entity 13 may similarly communicate with network 14 via wired or wireless means.

In one embodiment, user device 11 may be embodied by a mobile terminal. In this regard, a block diagram of a mobile terminal 25 that would benefit from embodiments of the present invention is illustrated in FIG. 2. It should be understood, however, that the mobile terminal 25 as illustrated and hereinafter described is merely illustrative of one type of user device that may benefit from embodiments of the present invention and, therefore, should not be taken to limit the scope of embodiments of the present invention. As such, although numerous types of mobile terminals, such as PDAs, mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, may readily employ embodiments of the present invention, other user devices including fixed (non-mobile) electronic devices may also employ some example embodiments.

The mobile terminal 25 may include an antenna 17 (or multiple antennas) in operable communication with a transmitter 18 and a receiver 20. The mobile terminal 25 may further include an apparatus, such as a processor 22 or other processing device (e.g., processor 50 of the apparatus of FIG. 3), which controls the provision of signals to, and the receipt of signals from, the transmitter 18 and receiver 20, respectively. The signals may include signaling information in accordance with the air interface standard of an applicable cellular system, and also user speech, received data and/or user generated data. In this regard, the mobile terminal 25 is capable of operating with one or more air interface standards, communication protocols, modulation types, and access types. By way of illustration, the mobile terminal 25 is capable of operating in accordance with wireless communication mechanisms. For example, mobile terminal 25 may be capable of communicating in a wireless local area network (WLAN) or other communication networks, for example in accordance with one or more of the IEEE 802.11 family of standards, such as 802.11a, b, g, or n. As an alternative (or additionally), the mobile terminal 25 may be capable of operating in accordance with any of a number of first, second, third and/or fourth-generation cellular communication protocols or the like. For example, the mobile terminal 25 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like.

In some embodiments, the processor 22 may include circuitry desirable for implementing audio and logic functions of the mobile terminal 25. For example, the processor 22 may be comprised of a digital signal processor device, a microprocessor device, and various analog to digital converters, digital to analog converters, and other support circuits. Control and signal processing functions of the mobile terminal 25 are allocated between these devices according to their respective capabilities. The processor 22 thus may also include the functionality to convolutionally encode and interleave message and data prior to modulation and transmission. The processor 22 may additionally include an internal voice coder, and may include an internal data modem. Further, the processor 22 may include functionality to operate one or more software programs, which may be stored in memory. For example, the processor 22 may be capable of operating a connectivity program, such as a conventional Web browser. The connectivity program may then allow the mobile terminal 25 to transmit and receive Web content, such as location-based content and/or other web page content, according to a Wireless Application Protocol (WAP), Hypertext Transfer Protocol (HTTP) and/or the like, for example.

The mobile terminal 25 may also comprise a user interface including an output device such as a conventional earphone or speaker 26, a ringer 24, a microphone 28, a camera 40, a display 30, and a user input interface, all of which are coupled to the processor 22. The camera 40 may be configured to capture still images and/or video and to provide the still images and/or video to the processor for processing. The user input interface, which allows the mobile terminal 25 to receive data, may include any of a number of devices allowing the mobile terminal 25 to receive data, such as a keypad 32, a touch screen display (display 30 providing an example of such a touch screen display) or other input device. In embodiments including the keypad 32, the keypad 32 may include the conventional numeric (0-9) and related keys (#, *), and other hard and soft keys used for operating the mobile terminal 25. Alternatively or additionally, the keypad 32 may include a conventional QWERTY keypad arrangement. The keypad 32 may also include various soft keys with associated functions. In addition, or alternatively, the mobile terminal 25 may include an interface device such as a joystick or other user input interface. Some embodiments employing a touch screen display, as described further below, may omit the keypad 32 and any or all of the speaker 26, ringer 24, and microphone 28 entirely. The mobile terminal 25 further includes a battery, such as a vibrating battery pack, for powering various circuits that are required to operate the mobile terminal 25, as well as optionally providing mechanical vibration as a detectable output.

The mobile terminal 25 may further include a user identity module (UIM) 34. The UIM 34 is typically a memory device having a processor built in. The UIM 34 may include, for example, a subscriber identity module (SIM), a universal integrated circuit card (UICC), a universal subscriber identity module (USIM), a removable user identity module (R-UIM), etc. The UIM 34 typically stores information elements related to a mobile subscriber. In addition to the UIM 34, the mobile terminal 25 may be equipped with memory. For example, the mobile terminal 25 may include volatile memory 36, such as volatile Random Access Memory (RAM) including a cache area for the temporary storage of data. The mobile terminal 15 may also include other non-volatile memory 38, which may be embedded and/or may be removable. The memories may store any of a number of pieces of information, and data, used by the mobile terminal 15 to implement the functions of the mobile terminal 25.

Example embodiments of the invention will now be described with reference to FIG. 3, in which certain elements of an apparatus 45 for managing crowd sourced content creation. The apparatus 45 of FIG. 3 may be employed, for example, in conjunction with one or both of network entity 13 and user device 11. However, it should be noted that the apparatus 45 of FIG. 3 may also be employed in connection with a variety of other devices, both mobile and fixed, in order to managing crowd sourced content creation. For example, the apparatus 45 may be embodied by or associated with a personal computer or other user terminal.

It should also be noted that while FIG. 3 illustrates one example of a configuration of an apparatus 45 for managing crowd sourced content creation, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 3, the apparatus 45 for managing crowd sourced content creation may include or otherwise be in communication with a processor 50, a communication interface 54, and a memory device 56. As described below and as indicated by the dashed lines in FIG. 3, the apparatus 45 may also optionally include a user interface 52 and/or one or more content recording elements 58 in some embodiments, such as embodiments in which the apparatus 45 is embodied as user device 11. In some embodiments, the processor 50 (and/or co-processors or any other processing circuitry assisting or otherwise associated with the processor 50) may be in communication with the memory device 56 via a bus for passing information among components of the apparatus 45. The memory device 56 may include, for example, one or more volatile and/or non-volatile memories. In other words, for example, the memory device 56 may be an electronic storage device (e.g., a computer readable storage medium) comprising gates configured to store data (e.g., bits) that may be retrievable by a machine (e.g., a computing device like the processor 50). In the embodiment in which the apparatus 45 is embodied as a mobile terminal 25, the memory device 56 may be embodied by the memory 36, 38 and the one or more content recording elements 58 may be embodied by the camera 40 and/or the microphone 28. The memory device 56 may be configured to store information, data, content, applications, instructions, or the like, for enabling the apparatus to carry out various functions in accordance with an example embodiment of the present invention. For example, the memory device 56 could be configured to buffer input data, such as image, video, and/or sound data from the one or more content recording elements 58, for processing by the processor 50. Additionally or alternatively, the memory device 56 could be configured to store instructions for execution by the processor 50.

The apparatus 45 may, in some embodiments, be embodied by or associated with a user terminal (e.g., mobile terminal 25) or a fixed communication device or computing device (e.g., network entity 13) configured to employ an example embodiment of the present invention. However, in some embodiments, the apparatus 45 may be embodied as a chip or chip set. In other words, the apparatus 45 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 45 may therefore, in some cases, be configured to implement an embodiment of the present invention on a single chip or as a single "system on a chip." As such, in some cases, a chip or chipset may constitute means for performing one or more operations for providing the functionalities described herein.

The processor 50 may be embodied in a number of different ways. For example, the processor 50 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 50 may include one or more processing cores configured to perform independently. A multi-core processor may enable multiprocessing within a single physical package. Additionally or alternatively, the processor 50 may include one or more processors configured in tandem via the bus to enable independent execution of instructions, pipelining and/or multithreading. In the embodiment in which the apparatus 45 is embodied as a mobile terminal 25, the processor 50 may be embodied by the processor 22.

In an example embodiment, the processor 50 may be configured to execute instructions stored in the memory device 56 or otherwise accessible to the processor 50. Alternatively or additionally, the processor 50 may be configured to execute hard coded functionality. As such, whether configured by hardware or software methods, or by a combination thereof, the processor 50 may represent an entity (e.g., physically embodied in circuitry) capable of performing operations according to an embodiment of the present invention while configured accordingly. Thus, for example, when the processor 50 is embodied as an ASIC, FPGA or the like, the processor 50 may be specifically configured hardware for conducting the operations described herein. Alternatively, as another example, when the processor 50 is embodied as an executor of software instructions, the instructions may specifically configure the processor 50 to perform the algorithms and/or operations described herein when the instructions are executed. However, in some cases, the processor 50 may be a processor of a specific device (e.g., a mobile terminal or network entity) configured to employ an embodiment of the present invention by further configuration of the processor 50 by instructions for performing the algorithms and/or operations described herein. The processor 50 may include, among other things, a clock, an arithmetic logic unit (ALU) and logic gates configured to support operation of the processor 50.

Meanwhile, the communication interface 54 may be any means such as a device or circuitry embodied in either hardware or a combination of hardware and software that is configured to receive and/or transmit data from/to a network, such as network 14, and/or any other device or module in communication with the apparatus 45. In this regard, the communication interface 54 may include, for example, an antenna (or multiple antennas) and supporting hardware and/or software for enabling communications with a wireless communication network. Additionally or alternatively, the communication interface 54 may include the circuitry for interacting with the antenna(s) to cause transmission of signals via the antenna(s) or to handle receipt of signals received via the antenna(s). In some environments, the communication interface 54 may alternatively or also support wired communication. As such, for example, the communication interface 54 may include a communication modem and/or other hardware/software for supporting communication via cable, digital subscriber line (DSL), universal serial bus (USB) or other mechanisms. In the embodiment in which the apparatus 45 is embodied as a mobile terminal 15, the communication interface 54 may be embodied by the antenna 16, transmitter 18, receiver 20 or the like.

In some embodiments, such as instances in which the apparatus 45 is embodied by the user device 11, the apparatus 45 may include a user interface 52 that may, in turn, be in communication with the processor 50 to receive an indication of a user input and/or to cause provision of an audible, visual, mechanical or other output to the user. As such, the user interface 52 may include, for example, a keyboard, a mouse, a joystick, a display, a touch screen(s), touch areas, soft keys, a microphone, a speaker, or other input/output mechanisms. Alternatively or additionally, the processor 50 may comprise user interface circuitry configured to control at least some functions of one or more user interface elements such as, for example, a speaker, ringer, microphone, display, and/or the like. The processor 50 and/or user interface circuitry comprising the processor 50 may be configured to control one or more functions of one or more user interface elements through computer program instructions (e.g., software and/or firmware) stored on a memory accessible to the processor 50 (e.g., memory device 56, and/or the like). In other embodiments, however, such as in instances in which the apparatus 45 is embodied by network entity 13, the apparatus 45 may not include a user interface 52. In still other embodiments, a plurality of apparatuses 45 may be associated with respective devices or the components of the apparatus 45 may be distributed over multiple devices.

In some embodiments, such as instances in which the apparatus 45 is embodied by the user device 11, the apparatus 45 may include one or more content recording elements 58 that may, in turn, be in communication with the processor 50 to receive and process the content and/or to cause the content to be stored, presented, and/or transmitted, such as via the memory device 56, the user interface 52, and/or the communication interface 54, respectively. The one or more content recording elements 58 may include, for example, one or more microphones configured to record audio content (e.g., the microphone 28 of the mobile terminal 25, and/or the like) and/or one or more cameras configured to record visual content such as still photos and/or video (e.g., the camera 40 of the mobile terminal 25, and/or the like). The one or more cameras may additionally or alternatively comprise one or more stereoscopic cameras or Time-of-Flight cameras, or other types of cameras configured to record three-dimensional content. It will be understood that the above are only a few examples of the types of content recording elements 58 that may be used according to embodiments of the present invention and that, indeed, any type of content recording element may additionally or alternatively be used, even if it has not been specifically provided as an example herein.

Turning now to FIG. 4, a block diagram of a system according to an example embodiment of the present invention is depicted. As shown, one or more content recording devices, such as one or more of the user devices 11 depicted in FIG. 1, may be in communication with a network entity 13, such as a server. Each of the content recording devices 11 may provide respective information regarding the content recording device 400 to the server 13 which, in turn, may provide this information 400 to a permission granting logic 410, the details of which will be discussed below. This information may include, for example, information regarding a location of the content recording device 11, such as GPS coordinates or the like; whether the content recording device 11 is currently recording content or not; when the content recording device 11 started or stopped recording content; information regarding an orientation of the content recording device, such as data from an accelerometer, compass, gyroscope, or other sensors; information regarding one or more content recording elements 58 of the content recording device 11, such as specifications of one or more cameras, microphones, or other content recording elements.

According to one example embodiment, the information regarding the content recording device 400 may also or alternatively include information regarding a user associated with the content recording device 11, such as an identifier or login credentials, e.g., a user name and/or password, associated with a user profile or account associated with the user. As shown, information regarding the user profile or account may, for example, be stored in a database 420 in the server 13, such as in the memory device 56 of an apparatus 45 associated with the server. The database 420 containing the information regarding the user profiles or accounts may also, according to other example embodiments, exist outside of the server 13, such as in another server in communication therewith. The information regarding the user profile or account may, for example, include historical information, such as information regarding content recordings the user has previously contributed to crowd sourced content creation projects. For example, the historical information may comprise information such as an average duration of recorded content submitted by the user per project, how frequently recorded content submitted by the user is chosen for inclusion in projects, information regarding reviews or ratings of recorded content contributed by the user, how many crowd sourced projects the user has submitted recorded content for, and/or any other types of historical information regarding content recordings created and/or contributed by the user.

The information regarding the user profile or account may additionally or alternatively comprise, for example, demographic information such as the user's age or sex. According to another example embodiment, the information regarding the user profile or account may include any of the information regarding the content recording device discussed above. Thus, for example, specifications of the user's content recording device or the content recording elements thereof may be stored in the server 13 and associated with the user's profile or account. It will be understood that the above are only examples of the types of information regarding content recording devices that may be provided to the server 13 and that many other types of information may also or alternatively be provided according to embodiments of the present invention.

Other information that may be provided to the permission granting logic 410 includes information regarding a recording subject 430. This information 430 may, for example, include information about a venue in which the content recording is taking place, or a performer or event that is being recorded, such as restrictions on content recording or uploading which may be imposed by the venue, performer, or organizers of the event. The information 430 may also include restrictions imposed by a manager of the crowd sourced project. The information 430 may, for example, include information regarding the number of users that are allowed to record content; information regarding timing restrictions, such as restrictions on when content recording is or is not permitted to occur; information regarding location restrictions, such as where content recording is and/or is not permitted to take place; information regarding restrictions on recording subjects, such as what is and is not permitted to be recorded (e.g., a concert may allow audio recordings, but not video, or may allow video recordings of the stage and crowd, but not of persons at the bar); information regarding bandwidth restrictions, such as how much content is permitted to be uploaded or when such uploads may take place; and/or information regarding the quality of content that is permitted to be recorded.

As depicted, the server 13 may be configured to apply permission granting logic 410 to the received information. Thus, turning now to FIG. 5, operations of the permission granting logic 410 according to an example embodiment are depicted. In this regard and as described below, the operations of FIG. 5 may be performed by an apparatus 45, such as shown in FIG. 3, embodied by or otherwise associated with the server 13. In this regard, the apparatus 45 may include means, such as a processor 50, a memory device 56, and a communication interface 54 or the like, for receiving information regarding at least one content recording device. See operation 500. The apparatus may further include means, such as those just listed, for receiving information regarding a recording subject. See operation 510.

The apparatus 45 embodied by or otherwise associated with the server 13 may further include means, such as a processor 50 and a memory device 56 or the like, for determining, based at least in part on the information regarding the at least one content recording device and the information regarding the recording subject, whether the at least one content recording device is eligible to receive at least one permission indicator. See operation 540. Determining whether a content recording device is eligible to receive a permission indicator may be accomplished in any number of ways. For example, the apparatus may determine whether a particular content recording device is eligible to receive at least one permission indicator by comparing the information regarding the particular content recording device to various criteria established by a manager of the crowd sourced project.

The apparatus 45 may further include means, such as a processor 50 and a memory device 56, and a communication interface 54 or the like, for causing the at least one permission indicator to be provided to the at least one recording device in an instance in which the apparatus 45 determines that the at least one content recording device is eligible to receive the at least one permission indicator. See operation 550. The permission indicator may, for example, comprise a token. The permission indicator may, for example, indicate one or more types of content that is or is not permitted to be recorded. The permission indicator may also or alternatively indicate one or more contexts in which content is or is not permitted to be recorded. This may include, for example, information regarding permissible or impermissible times for recording, durations of the recordings, locations where recording can take place, orientations of the content recording device, etc. The permission indicator may also or alternatively indicate whether the content recording device is permitted to upload recorded content and/or information regarding one or more contexts in which recorded content is or is not permitted to be uploaded by the content recording device. It will be understood that the apparatus 45 may provide differentiated permission indicators to the content recording devices. That is, the permission indicator provided to a first content recording device may differ in at least one regard, such as in the scope or nature of the permissions provided, from a permission indicator provided to a second content recording device. For example, a first permission indicator may be provided to a first content recording device that permits the first device to record content from a first location, while a second permission indicator may be provided to a second device that permits the second device to record content from a second location.

Returning now to operation 540, in which the determination of whether a content recording device is eligible to receive a permission indicator, according to one example embodiment, the determination of whether a content recording device is eligible to receive at least one permission indicator may be made based on a ranked order of users. Thus, according to an example embodiment, the apparatus 45 embodied by or otherwise associated with the server 13 may include means, such as those discussed above, for determining a number of available permission indicators. See operation 520. The number of available permission indicators may be determined, for example, based at least in part on the information regarding the recording subject. According to a further example embodiment, the number of available permission indicators may vary by location or time. That is, a certain number of permission indicators may be available for certain areas or periods of time, while fewer or greater numbers of permission indicators may be available for other areas or other periods of time. For example, if the recording subject was a concert, a greater number of permission indicators may be available for content recording devices that are located near the stage, while fewer may be available for content recording devices which are located farther away from the stage. Similarly, more permission indicators may be available during the first few songs of the concert than are available after the first few songs.

The apparatus 45 may further include means for determining a ranked order of a plurality of users associated with the one or more content recording devices. See operation 530. The ranking may be determined, for example, based on the information regarding the one or more recording devices received during operation 500. As discussed above, this may include a wide variety of data, such as location information, information regarding the specifications of one or more content recording elements, etc. The information may also include information regarding one or more users associated with the one or more content recording devices and/or their associated user profiles or accounts, as discussed above. Thus, according to one example embodiment, users may be ranked based on any of this information, such as by prioritizing experienced users and/or users with high quality content recording elements.

According to one example embodiment, users may be ranked using a points-based system. For example, two or more ranked orders of the users may be respectively determined based on one two or more different criteria and, according to the users' two or more rankings, a point total may be determined and a final ranking may be determined based on this point total. For example, users may be ranked, according to one embodiment, based on: (1) their experience (e.g., how many crowd sourced projects they have contributed content recordings to) and (2) the quality of their prior content recordings (e.g., how often their content recordings have been incorporated into a final crowd sourced project). Thus, for example, all the users may be ranked according to (1) and also ranked according to (2), then points may be assigned to the users based on their respective rankings in each list, e.g., 100 points may be awarded for being ranked first based on criteria (1), 95 for being ranked second, etc., and these points may be added together to determine an overall ranking. For example, a user ranked first based on criteria (1) and fourth based on criteria (2) may receive a total of 185 points, which may result in the user being ranked second overall, below a user ranked second based on both criteria (1) and (2), who would receive a total of 190 points. It will be understood that this is merely one example of a scheme for ranking users and that any number of ranking schemes may be used.

Regardless of how the users are ranked, once the ranked order is determined the apparatus 45 may determine which of the content recording devices are eligible to receive a permission indicator, such as by determining which of the users associated with the content devices are ranked highly enough to receive one of the available permission indicators. That is, if five permission indicators are available, then only the content recording devices associated with the top five highest-ranked users would be eligible to receive a permission indicator. As discussed above, the number of available permission indicators may vary with location. Accordingly, multiple ranked orders may be determined for each location. For example, if eight permission indicators are available for an area close to the stage and three are available for an area farther from the stage, a ranked order may be determined for the users associated with content recording devices which are located in the area close to the stage and a separate ranked order would be determined for the users associated with content recording devices which are located in the area farther away from the stage.

This concept and its effect on a plurality of users is illustrated in FIGS. 6 and 7. As seen in FIG. 6, eight permission indicators are available for the area close to the stage and three are available for the area farther from the stage. Only six users are located in the area close to the stage and six are located in the area farther from the stage. Thus, in the depicted scenario, two of the permission indicators available to the area close to the stage are unused, and three users located farther away from the stage are unable to receive permission indicators. The three users located farther away from the stage may, for example, have been ranked below the three users who received permission indicators, or were otherwise determined to be ineligible to receive the permission indicators. As shown in FIG. 7, the imbalance between the numbers of available permission indicators and the demand for permission indicators can be cured by having two users move from the area farther away from the stage to the area closer to the stage.

Example embodiments may facilitate this type of corrective behavior and others. For instance, apparatus 45 may, according to an example embodiment, further include means, such as a processor 50 and a memory device 56, and a communication interface 54 or the like, for causing information regarding how a particular content recording device may become eligible to receive a permission indicator. See operation 560. This information may be provided, for example, to the particular content recording device in an instance in which it has been determined that the particular content recording device is ineligible to receive a permission indicator. According to an example embodiment, a representation of this information may then be caused to be displayed to a user of the particular content recording device. Thus, for example, an apparatus 45 embodied by or otherwise associated with the particular content recording device may include means, such as a processor 50, a memory device 56, a communication interface 54, and a user interface 52 or the like, for receiving the information and causing a representation of the information to be displayed. The information may include, for example, information regarding a location or point of interest that a user may move their recording device to in order to be eligible to receive a permission indicator. According to another example, the information may include suggestions regarding a user account, such as a suggestion to upload previously-recorded content, fill in profile information, or to take various other actions which may make the user's content recording device eligible to receive a permission indicator, such as by increasing the user's rank enough to become eligible to receive one of the available permission indicators.

FIGS. 8*a* and 8*b* illustrate examples of representations of the information according to two example embodiments. As shown in FIG. 8*a*, the representation may comprise an indication that a permission indicator is not available in the content recording device's current location 800 and an indication of how the user of the content recording device may move so as to become eligible to receive a permission indicator 810. The information, such as the indications 800 and 810 may, for example, be presented overlaying a preview of the content being recorded. Thus, for example, as the user uses his or her recording device to record a video, the information may be displayed overlaying the video preview as the video is being recorded.

According to another example embodiment, the permission indicator provided to an eligible recording device may include information regarding desired attributes of the content recording. For example, the information may include a point of interest to record or record from. The permission indicator may also or alternatively include information regarding other desired attributes of the content recording, such as a desired orientation of the recording device, a desired attitude of the recording device with respect to horizontal, a desired altitude of the recording device, a desired shooting position of the recording device, and/or any other attributes. In this way, the provider of the permission indicator may exert control over the content recordings made by the various recording devices that have received permission indicators. A representation of this information may thus be caused to be displayed by the apparatus 45 embodied by or otherwise associated with the recording device. An example of such a representation is depicted in FIG. 8*b*. As shown, an indicator 820, such as an arrow or vector, may be shown to direct a user towards a point of interest, or to aim their content recording device in a certain direction so as to record content from the point of interest.

One or more of operations 500, 510, 520, 530, 540, 550, and 560 may, according to some example embodiments, be repeated. For example, according to one embodiment one or more of the operations may be repeated periodically, such as at set intervals. Thus, permission indicators may be re-allocated as user ranks and/or the numbers of available permission indicators change.

As described above, FIG. 5 illustrates a flowchart of an apparatus 45, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included, some of which are indicated with dotted lines in FIG. 5. Modifications, additions, or enhancements to the operations above may be performed in any order and in any combination.

The method, apparatus 45 and computer program product described above provide many advantages. For example the method, apparatus 45 and computer program products may provide mechanisms for managing crowd sourced content creation from remote locations. Embodiments of the present invention may allow producers of crowd sourced content to gather high quality user content with fewer users than traditional systems enabling possibly bad content (e.g., content from inexperienced users, content from users with poor quality content recording devices, or content from users in poor locations) to be pre-pruned, as opposed to sorting out this bad content after it has already been collected. Embodiments of the present invention may allow the amount of data uploaded or upstreamed by users to be limited, thus preserving bandwidth. Embodiments of the present invention may also allow users to be relocated on the fly as content recording needs change.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. A method comprising:
receiving information regarding at least one content recording device;
receiving information regarding a recording subject;
determining, by a processor and based at least in part on the information regarding the at least one content recording device and the information regarding the recording subject, whether the at least one content recording device is eligible to receive at least one permission indicator providing an authorization for a content recording element of the at least one content recording device to record content or for the at least one content recording device to upload recorded content, wherein the content recording element comprises at least one of a microphone or a camera; and
causing the at least one permission indicator to be provided to the at least one content recording device in an instance in which it is determined that the at least one content recording device is eligible to receive the at least one permission indicator.

2. The method of claim 1, wherein the information regarding the at least one content recording device comprises information regarding at least one user associated with the at least one content recording device.

3. The method of claim 1, wherein the at least one permission indicator indicates at least one of: one or more types of content that are or are not permitted to be recorded or one or more contexts in which content is or is not permitted to be recorded.

4. The method of claim 1, wherein the at least one permission indicator indicates whether recorded content is permitted to be received from the at least one content recording device.

5. The method of claim 1, wherein:
the at least one permission indicator comprises a first permission indicator and a second permission indicator, the first and second permission indicators indicating permissions that are different in at least one respect; and
causing the at least one permission indicator to be provided to the at least one content recording device comprises causing the first permission indicator to be provided to a first content recording device and causing the second permission indicator to be provided to a second content recording device.

6. The method of claim 1, wherein the at least one content recording device comprises a plurality of content recording devices and receiving information regarding the at least one content recording device comprises receiving information regarding each of a plurality of users respectively associated with each of the plurality of content recording devices, the method further comprising:
determining, based on the information regarding each of the plurality of users, a ranked order of the plurality of users;
wherein determining whether the at least one content recording device is eligible to receive the at least one permission indicator comprises determining, based at least in part on the ranked order of the plurality of users, whether each of the plurality of content recording devices is eligible to receive the at least one permission indicator.

7. The method of claim 1, further comprising determining, based at least in part on the information regarding the recording subject, a maximum number of available permission indicators.

8. The method of claim 1, further comprising causing, in an instance in which it is determined that the at least one content recording device is not eligible to receive the at least one permission indicator, information regarding how the at least one content recording device may become eligible to receive the at least one permission indicator.

9. An apparatus comprising at least one processor and at least one memory storing program code instructions, the memory and program code instructions being configured to, with the processor, direct the apparatus to at least:
receive information regarding at least one content recording device;
receive information regarding a recording subject;
determine, based at least in part on the information regarding the at least one content recording device and the information regarding the recording subject, whether the at least one content recording device is eligible to receive at least one permission indicator providing an authorization for a content recording element of the at least one content recording device to record content or for the at least one content recording device to upload recorded content, wherein the content recording element comprises at least one of a microphone or a camera; and
cause the at least one permission indicator to be provided to the at least one content recording device in an instance in which it is determined that the at least one content recording device is eligible to receive the at least one permission indicator.

10. The apparatus of claim 9, wherein the information regarding the at least one content recording device comprises information regarding at least one user associated with the at least one content recording device.

11. The apparatus of claim 9, wherein the at least one permission indicator indicates at least one of: one or more types of content that are or are not permitted to be recorded or one or more contexts in which content is or is not permitted to be recorded.

12. The apparatus of claim 9, wherein the at least one permission indicator indicates whether recorded content is permitted to be received from the at least one content recording device.

13. The apparatus of claim 9, wherein:
the at least one permission indicator comprises a first permission indicator and a second permission indicator, the first and second permission indicators indicating permissions that are different in at least one respect; and
the apparatus is directed to cause the at least one permission indicator to be provided to the at least one content recording device by causing the first permission indicator to be provided to a first content recording device and causing the second permission indicator to be provided to a second content recording device.

14. The apparatus of claim 9, wherein the at least one content recording device comprises a plurality of content recording devices and the apparatus is directed to receive information regarding the at least one content recording device by receiving information regarding each of a plurality of users respectively associated with each of the plurality of content recording devices, the apparatus being further directed to:
determine, based on the information regarding each of the plurality of users, a ranked order of the plurality of users;
wherein the apparatus is directed to determine whether the at least one content recording device is eligible to receive the at least one permission indicator by determining, based at least in part on the ranked order of the plurality of users, whether each of the plurality of content recording devices is eligible to receive the at least one permission indicator.

15. The apparatus of claim 9, wherein the apparatus is further directed to determine, based at least in part on the information regarding the recording subject, a maximum number of available permission indicators.

16. The apparatus of claim 9, wherein the apparatus is further directed to cause, in an instance in which it is determined that the at least one content recording device is not eligible to receive the at least one permission indicator, information regarding how the at least one content recording device may become eligible to receive the at least one permission indicator.

17. A computer program product comprising a computer-readable non-transitory storage medium storing program code portions therein, the program code portions being configured to, upon execution, direct an apparatus to at least:
receive information regarding at least one content recording device;
receive information regarding a recording subject;
determine, based at least in part on the information regarding the at least one content recording device and the information regarding the recording subject, whether the at least one content recording device is eligible to receive at least one permission indicator providing an authorization for a content recording element of the at least one content recording device to record content or for the at least one content recording device to upload recorded content, wherein the content recording element comprises at least one of a microphone or a camera; and
cause the at least one permission indicator to be provided to the at least one content recording device in an instance in which it is determined that the at least one content recording device is eligible to receive the at least one permission indicator.

18. The computer program product of claim 17, wherein:
the at least one permission indicator comprises a first permission indicator and a second permission indicator, the first and second permission indicators indicating permissions that are different in at least one respect; and
the apparatus is directed to cause the at least one permission indicator to be provided to the at least one content recording device by causing the first permission indicator to be provided to a first content recording device and causing the second permission indicator to be provided to a second content recording device.

19. The computer program product of claim 17, wherein the at least one content recording device comprises a plurality of content recording devices and the apparatus is directed to receive information regarding the at least one content recording device by receiving information regarding each of a plurality of users respectively associated with each of the plurality of content recording devices, the apparatus being further directed to:
determine, based on the information regarding each of the plurality of users, a ranked order of the plurality of users;
wherein the apparatus is directed to determine whether the at least one content recording device is eligible to receive the at least one permission indicator by determining, based at least in part on the ranked order of the plurality of users, whether each of the plurality of content recording devices is eligible to receive the at least one permission indicator.

20. The computer program product of claim 17, wherein the apparatus is further directed to cause, in an instance in which it is determined that the at least one content recording device is not eligible to receive the at least one permission indicator, information regarding how the at least one content recording device may become eligible to receive the at least one permission indicator.

* * * * *